United States Patent [19]

Suzuki et al.

[11] 4,089,049

[45] May 9, 1978

[54] INVERTER CIRCUIT INCLUDING TRANSFORMER WITH SHIELDING OF UNDESIRED RADIATIONS

[75] Inventors: Tadao Suzuki; Tadao Yoshida; Shigeaki Wachi, all of Tokyo, Japan

[73] Assignee: Sony Corporation, Tokyo, Japan

[21] Appl. No.: 693,522

[22] Filed: Jun. 7, 1976

[30] Foreign Application Priority Data

Jun. 11, 1975 Japan .................................. 50-70650
Aug. 22, 1975 Japan ................................. 50-101794

[51] Int. Cl.² .......................................... H02M 3/335
[52] U.S. Cl. ........................................ 363/17; 307/91; 336/84 C; 363/39; 363/132
[58] Field of Search ................. 321/2.45 R, 8 R, 8 C; 331/113 A; 325/357; 330/68; 315/85; 307/91; 336/69, 70, 84 C; 363/17, 39, 132

[56] References Cited

U.S. PATENT DOCUMENTS

| | | | |
|---|---|---|---|
| 792,248 | 6/1905 | Campbell | 336/84 C |
| 1,786,412 | 12/1930 | Crisson | 336/84 C |
| 1,837,245 | 12/1931 | Wheeler | 336/84 C |
| 3,286,153 | 11/1966 | Inose | 321/8 R |
| 3,465,232 | 9/1969 | Weber | 321/8 R |
| 3,582,754 | 6/1971 | Hoffmann et al. | 321/2 |
| 3,840,798 | 10/1974 | Burchall | 363/17 |

Primary Examiner—William M. Shoop
Attorney, Agent, or Firm—Hill, Gross, Simpson, Van Santen, Steadman, Chiara & Simpson

[57] ABSTRACT

A transformer with an electrostatic shield body between its primary and secondary windings, one end of the shield body being connected to a zero potential point of the primary side from the AC standpoint. This reduces the capacity coupling between the primary and secondary windings. This transformer is particularly useful with an inverter.

The transformer may include primary and secondary windings, each having a pair of terminals, and a magnetic core provided in connection with the primary and secondary windings magnetically. First and second static shield bodies may be provided at each side of the primary and secondary windings and therebetween, and these first and second static shield bodies are electrically connected to one terminal of the primary and secondary windings, respectively, so as to reduce the capacitance therebetween.

1 Claim, 14 Drawing Figures

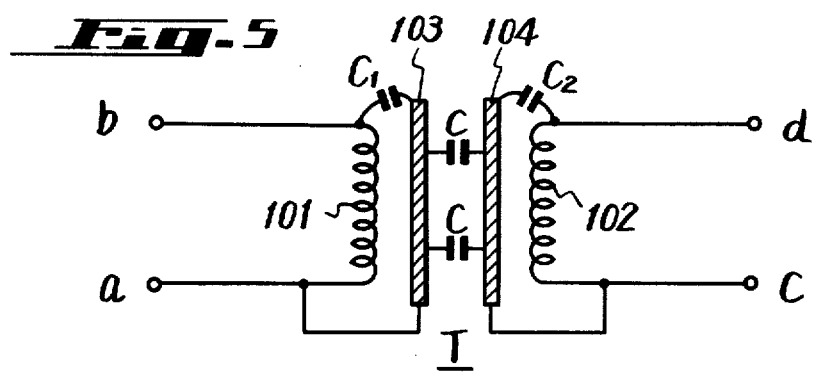
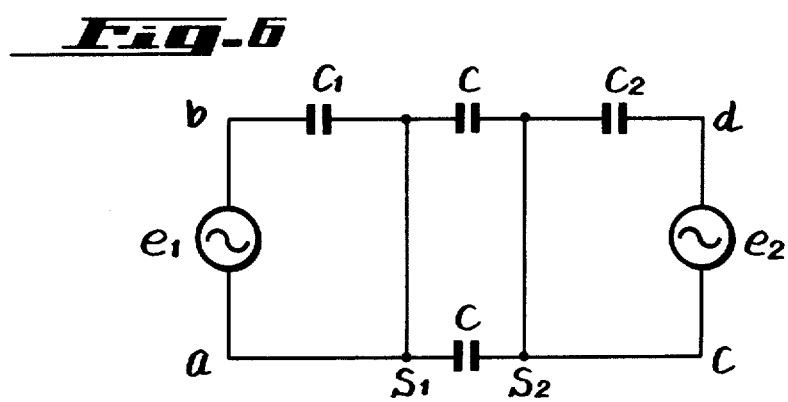
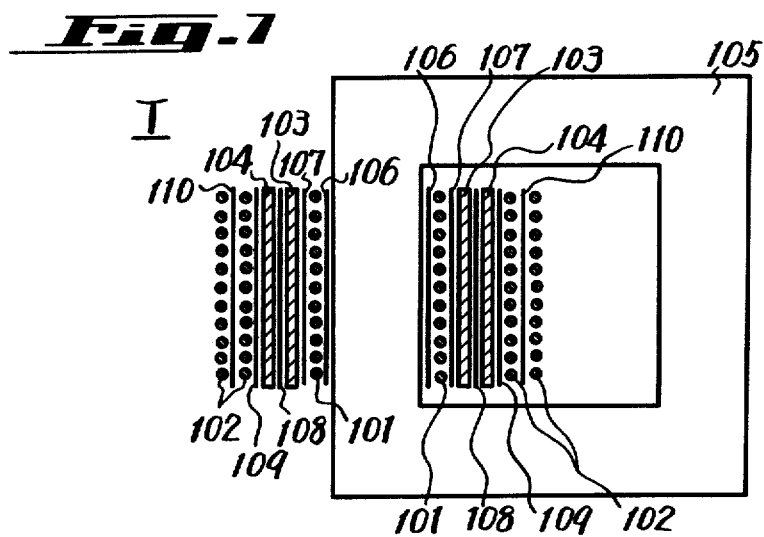

INVERTER CIRCUIT INCLUDING TRANSFORMER WITH SHIELDING OF UNDESIRED RADIATIONS

BACKGROUND OF THE INVENTION

1. Field of the Invention

This invention relates generally to a transformer, and more particularly to a transformer avoiding undesired radiation.

2. Description of the Prior Art

A prior art transformer used in an inverter will be described with reference to FIG. 1. In FIG. 1, 1 designates an AC power source. The input AC voltage from the AC power source 1 is supplied to a rectifying circuit 2, the rectified output from which is supplied to a series connection of capacitors 11 and 12. A series connection between the collector of a transistor 21 and the emitter of a transistor 22 is connected in parallel to the series connection of the capacitors 11 and 12. Control windings 31 and 32 of an input transformer are connected between the base and the emitter of the transistors 21 and 22, respectively. The emitter of the transistor 21 and the collector of the transistor 22 are connected together to the connection point between the capacitors 11 and 12 through a current feedback winding 33 of the transformer 30 and an input winding 41 of an input transformer 40. A voltage feedback winding 43 of the transformer 40 is connected through a resistor 9 to a voltage feedback winding 34 of the transformer 30, and an output winding 42 of the transformer 40 is connected to a rectifying circuit 4 which is connected to a smoothing circuit 5. In FIG. 1, 6 designates output terminals led out from the smoothing circuit 5; 30a the saturable core of the transformer 30; and 40a the ordinary magnetic core of the transformer 40, respectively.

With the above prior art inverter, when the transistors 21 and 22 are made ON and OFF alternately, a rectangular waveform AC current flows through the input winding 41 of the transformer 40. Thus, desired DC current can be delivered to the output terminals 6. At this time, the AC current flowing through the input winding 41 of the transformer 40 also flows in the winding 33 of the transformer 30, so that current feedback is carried out. The AC voltage induced at the winding 43 of the transformer 40 at this time is supplied to the winding 34 through the resistor 9 to achieve the voltage feedback. Thus, the ON and OFF of the transistors 21 and 22 are repeated.

With such a prior art inverter, if its oscillation frequency is selected high, for example, 20 KHz, the power source transformer 40 can be made compact and light in weight, and accordingly, the inverter itself can be made compact and light in weight.

In general, a power source transformer for a main amplifier used in an audio instrument and the like becomes very large in size. Due to this large size of the power source transformer, the main amplifier is restricted in its size and design and also associated parts are restricted in arrangement. However, with the inverter described above, its size can be made compact and also its shape can be selected freely, so that the main amplifier using the above inverter is not restricted in size and design and also its associated parts are not restricted in arrangement.

Since the above inverter is driven with the rectangular waveform signal, undesired radiations are produced. This will be described in detail. The equivalent circuit of the above inverter in view point of AC can be shown in FIG. 2A. Since the oscillation is carried out by the transistors 21, 22 and the input transformer 30, these are shown in FIG. 2A as an oscillator 3. The output transformer 40 is connected to the oscillator 3. In this case, there is formed a coupling capacity 40' between the input and output windings 41 and 42 of the transformer 40. Thus, the equivalent circuit of the inverter shown in FIG. 1 can be redrawn as in FIG. 2B in view of the coupling capacitor 40'. Further, the output winding 42 is selected the same in potential as that of the chassis (not shown) in view of AC, and the inverter is housed in a shield case 7, as shown in FIG. 2C. Thus, the inverter is connected to the chassis through a capacitor 71 formed between the inverter and the shield case 7.

On the other hand, the input terminal 1 is different from the output terminal 6 in potential in AC point of view, it is impossible to connect the input terminal 1 to the chassis. As a result, the input terminal 1 is floated from the chassis in electrical point of view.

Under such a condition, the rectangular oscillator 3 carries out its rectangular oscillation, so that the input terminal 1 acts as an antenna and hence electric noise waves (undesired radiations) caused by the rectangular waveform voltages are radiated outside through the shield case to badly affect the other circuits.

OBJECTS AND SUMMARY OF THE INVENTION

Accordingly, it is an object of the present invention to provide a transformer free from the defects encountered in the prior art.

It is another object of the invention to provide a transformer in which an electrostatic shield body is inserted between the primary and secondary windings of the transformer and one end of the shield body is connected to a zero potential point of the primary side in view of AC to reduce the coupling capacity between the primary and secondary windings.

It is a further object of the invention to provide a transformer suitable for use with an inverter.

In accordance with an aspect of the invention, there is provided a transformer which comprises a primary winding having a pair of terminals, a secondary winding having a pair of terminals, a magnetic core provided in connection with said primary and secondary windings magnetically, a static shield body interposed between the primary and secondary windings, and a circuit for connecting the static shield body to one of the pair of terminals of the primary winding so as to reduce the capacitance between the primary and secondary windings.

The other objects, features and advantages of the present invention will be apparent from the following description taken in conjunction with the attached drawings.

BRIEF DESCRIPTION OF THE DRAWINGS

FIG. 5 is a diagram showing another embodiment of the transformers of the invention;

FIG. 6 is an equivalent circuit of the transformer shown in FIG. 5;

FIG. 7 is a cross sectional view of the transformer shown in FIG. 5;

DESCRIPTION OF THE PREFERRED EMBODIMENTS

Figure 1:
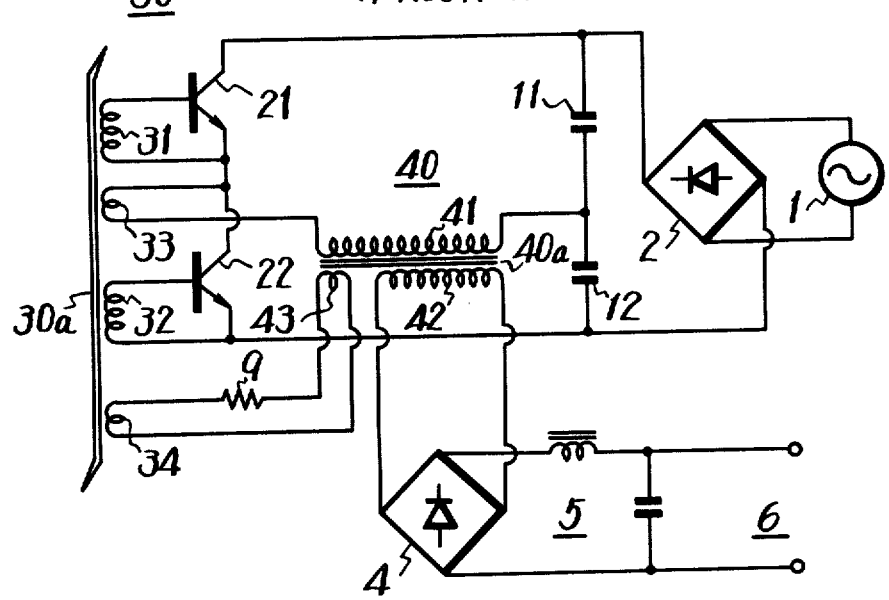
FIG. 1 is a circuit diagram showing an inverter in which a prior art transformer is used.
Figure 2A:
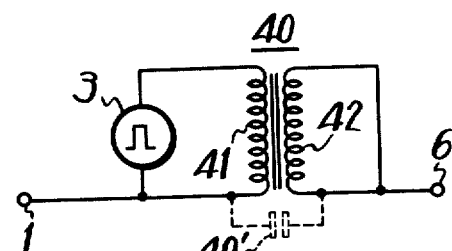
FIGS. 2A to 2C are equivalent circuits of the inverter shown in FIG. 1, respectively, used for explaining the operation of the inverter shown in FIG. 1.
Figure 2B:
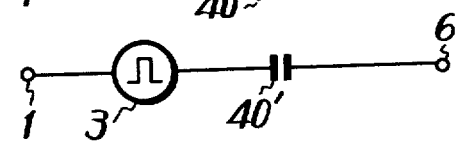
Figure 2C:
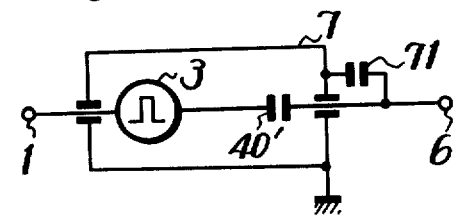

An embodiment of the transformers according to the invention will be described with reference to FIG. 3, which shows an inverter using the transformer of the invention and in which numerals the same as those of FIG. 1, designate the same elements and hence their description will be omitted.

Figure 3:
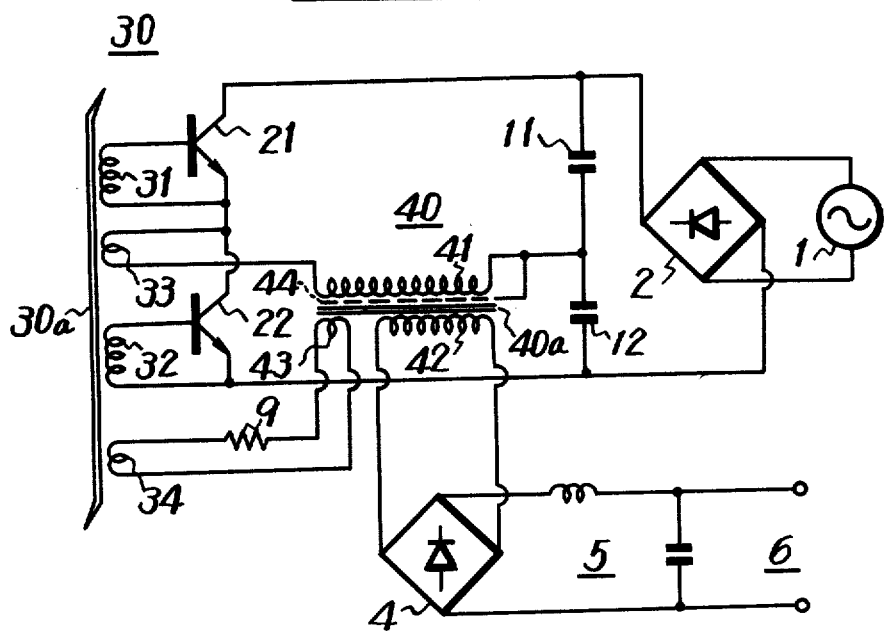
FIG. 3 is a circuit diagram showing an inverter in which an embodiment of the transformers according to the present invention is used.

The transformer of the invention shown in FIG. 3 has provided with a shield body or plate 44 interposed between the input (primary) winding 41 and the output (secondary) winding 42 of the output transformer 40. One end of the shield plate 44 is connected to a zero potential point in view of AC at the input side or the connection point between the capacitors 11 and 12. Thus, the shield plate 44 prevents the AC from being leaked out to the secondary side through the electrostatic capacitance between the input winding 41 and output winding 42 of the transformer 40.

Figure 4A:
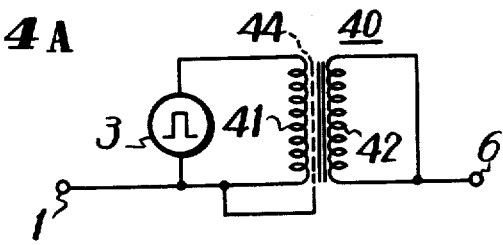
FIGS. 4A and 4B are equivalent circuits of the inverter shown in FIG. 3, respectively, used for explaining the operation of the inverter of FIG. 3.
Figure 4B:
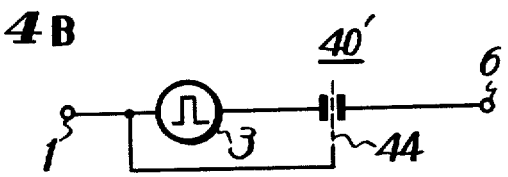

An equivalent circuit of the inverter shown in FIG. 3 can be shown in FIG. 4A and another equivalent circuit taking into account the capacitance 40' between the input and output windings 41 and 42 of the transformer 40 is shown in FIG. 4B. In FIGS. 4A and 4B, 3 designates the generation source of the rectangular wave at the input winding 41 of the transformer 40 (rectangular wave oscillator).

As may be apparent from FIG. 4B, both ends of the oscillator 3 are made equal in potential in view of AC through the electrostatic capacitance between the input winding 41 and the shield plate 44 or short-circuited in view of AC. As a result, even if the output terminal 6 as the secondary side of the transformer 40 is grounded in view of AC, no undesired radiation is radiated through the input terminal 1. In other words, the capacitance 40' between the input and output windings 41 and 42 of the output transformer 40 is substantially reduced by the insertion of the shield plate 44 and hence the undesired radiation caused by the capacitance can be reduced.

Another example of the transformers of the invention will be described with reference to FIGS. 5 to 7. In FIG. 5, T designates the transformer of the invention generally. This transformer T has shield bodies or plates 103 and 104 which are interposed between its primary and secondary windings 101 and 102. The shield plate 103 is connected to the primary winding 101 while the shield plate 104 is connected to the secondary winding 102.

With such a transformer T, when an AC voltage is supplied to the primary winding 101, electrostatic capacitances $C_1$, $C_2$ and $C$ are established as shown in FIG. 5, due to the existence of the shield plates 103 and 104. However, since the shield plates 103 and 104 are connected to terminals $a$ and $c$, respectively, as shown in FIG. 5, no electrostatic capacitances are established between the terminal $a$ and the shield plate 103 and between the terminal $c$ and the shield plate 104.

Accordingly, as may be apparent from FIG. 6 which shows an equivalent circuit of the transformer T shown in FIG. 5, no electrostatic capacitance is formed between the terminal $a$ and a connection point $S_1$ of the shield plate 103 to the primary side of the transformer T. Therefore, no electrostatic induction is caused therebetween. Also, electrostatic capacitance is not formed between the terminal $c$ and a connection point $S_2$ of the shield plate 104 to the secondary side of the transformer T, so that no electrostatic induction is caused therebetween.

As a result, no electromotive force is established between the terminals $a$ and $c$, no electrostatic induction is caused from the primary side to the secondary side and vice versa, and hence, electrostatic shield is substantially completely established therebetween. Accordingly, in practice, it becomes possible that the electromotive force between the terminals $a$ and $b$ is reduced by about 1/10.

The practical construction of the transformer T will be now described with reference to FIG. 7. A core 105 made of a magnetic material with the resistance of about several K$\Omega$ is prepared. The primary winding 101 is wound on the core 105 with an insulator 106 such as paper therebetween. On the winding 101, there are wound an insulating paper 107, the electrostatic shield plate 103, an insulating paper 108, the electrostatic shield plate 104, and an insulating paper 109 in this order. The secondary winding 102, which is made of two winding layers with an insulating paper 110 therebetween, is wound on the insulating paper 109. In this case, the shield plates 103 and 104 are made of conductive material such as Al or Cu.

An inverter, which employs as its output transformer the transformer T of the invention described in connection with FIGS. 5 to 7, will be described with reference to FIG. 8. This inverter is supplied with an AC voltage of a predetermined value at its pair of input terminals 111a and 111b. The AC voltage is rectified by a rectifying circuit 112 formed of a diode bridge, and the voltage of positive polarity is delivered to a line 114a while the voltage of negative polarity is delivered to a line 114b. A series connection of smoothing capacitors 113a and 113b is connected between the lines 114a and 114b. The line 114a is connected to the collector of a transistor $Q_1$, while the line 114b is connected to the emitter of a transistor $Q_2$. The emitter of the transistor $Q_1$ is connected to the collector of the transistor $Q_2$. The base of the transistor $Q_1$ is connected to one end of a secondary winding 116 of a transformer 115 which has a saturable core 115a, while the other end of the winding 116 is connected to the connection point between the emitter of the transistor $Q_1$ and the collector of the transistor $Q_2$. The base of the transistor $Q_2$ is connected to one end of a secondary winding 117 of the transformer 115 and the other end thereof is connected to the line 114b. In this case, the windings 116 and 117 are wound in reverse polarity with each other. The connection point between the emitter of the transistor $Q_1$ and the collector of the transistor $Q_2$ is connected through the primary winding 101 of the output transformer T to the connection point between the capacitors 113a and 113b. One end of the secondary winding 102 of the transformer T is connected through a rectifying diode 118 to an output terminal 119a, while its other end is connected to an output terminal 119b. A smoothing capacitor 120 is connected between the output terminals 119a and 119b. A feedback winding 121, which is provided at the primary side of the transformer T, is connected through a resistor 122 to a primary winding 123 of the transformer 115 to feedback a part of the induced voltage from the output transformer T to the input transformer 115 through the resistor 122. Thus, the transistors $Q_1$ and $Q_2$ are made ON and OFF or switched alternately. The output transformer T is provided with the shield plates 103 and 104 between the windings 101, 121 and the winding 102. In this case, the shield plate 103 is connected to the connection point between the capacitors 113a and 113b, while the shield plate 104 is connected to one end of the winding 102, respectively, as described previously.

Figure 8:
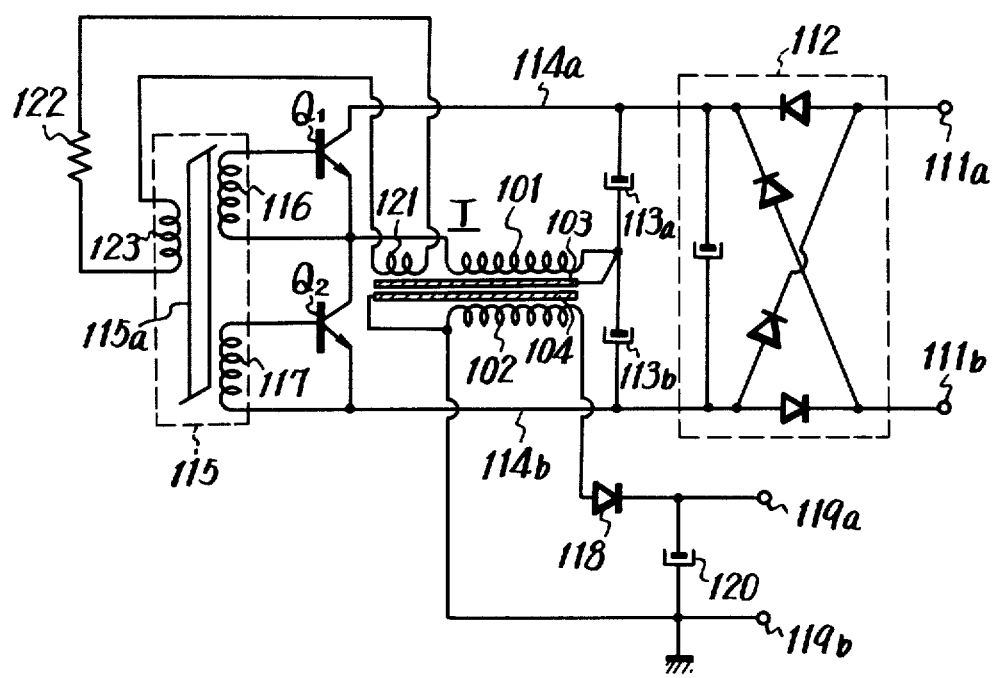
FIG. 8 is a circuit diagram showing an inverter in which the transformer shown in FIG. 5 is used.

With the inverter using the transformer T of the present invention shown in FIG. 8, when the transistors $Q_1$ and $Q_2$ are made ON and OFF alternately and hence, AC voltage being supplied to the primary winding 101 of the transformer T, electrostatic capacitances are prevented from being formed between the windings 101 and 102 and between the winding 121 and 102 as mentioned above. Thus, shielding effects can be obtained.

As described above, with the above example of the transformer T of the invention, without winding the primary and secondary windings 101 and 102 in a special manner, the formation of electrostatic capacitance therebetween can be avoided and hence, the electromotive force can be reduced a great deal. Especially, when the transformer of the invention is employed in an inverter, good effects can be obtained.

A further embodiment of the invention will be described with reference to FIGS. 9 to 11 in which the same parts as those of FIGS. 5 to 7 are marked with the same reference numerals and their detailed description will be omitted for the sake of simplicity.

Figure 9:
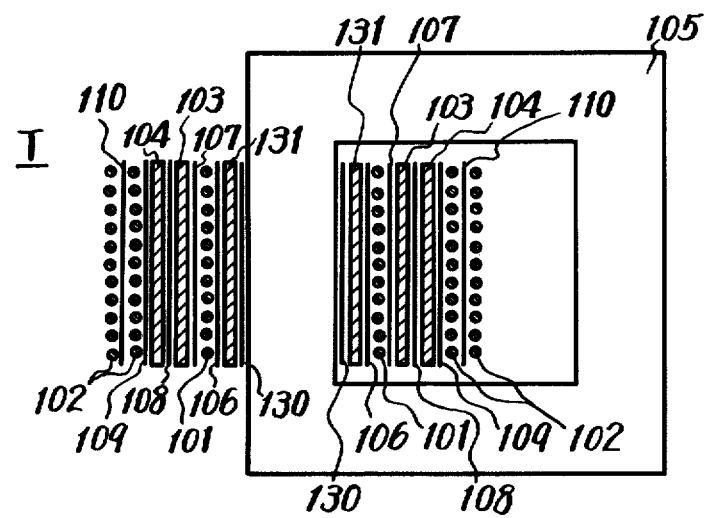
FIGS. 9 to 11, inclusive, are cross-sectional views and an equivalent circuit of further embodiment of the invention.
Figure 10:
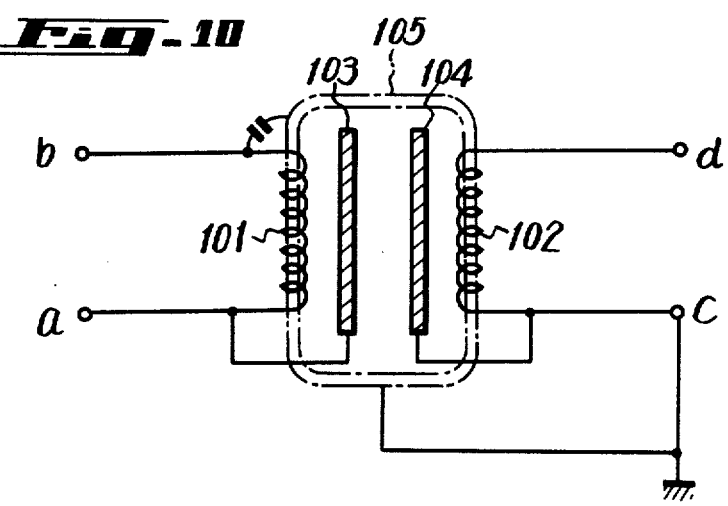
Figure 11:
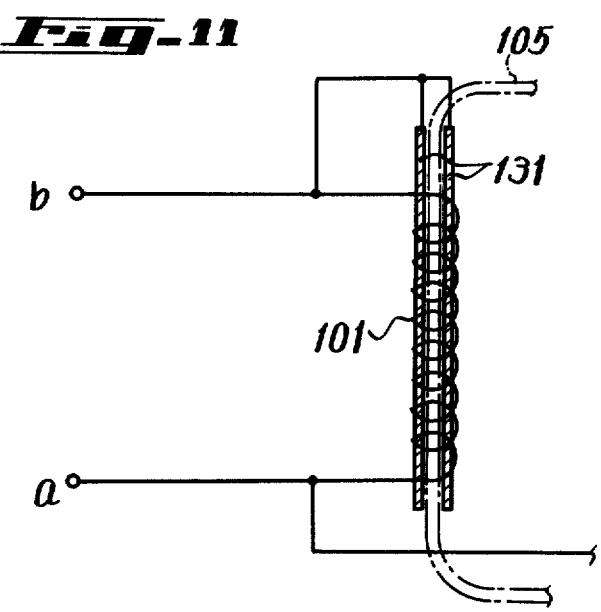

In the example of FIGS. 9 to 11, a third shield body or plate 131 is provided between the core 105 and the primary winding 101. That is, as shown in FIG. 9, between the insulating paper 106 and the core 105, there is disposed a third shield plate 131 and an insulating paper 130. In this case, the third shield plate 131 is connected to the primary side of the transformer T and the core 105 is connected through the chassis (not shown) to the secondary side of the transformer T. The other construction is substantially the same as that of the second example.

As shown in FIG. 10, if the third shield plate 131 is not provided in the transformer, there is formed electrostatic capacitance between the core 105 and the winding 101. As a result, a current flows through the core 105 and the secondary side to which the core 105 is connected, and hence, a noise is introduced into a receiver which employs such a transformer.

On the contrary, with the third example of the transformer of the invention, the third shield plate 131, which is connected to the primary side of the transformer T, is provided between the core 105 and the primary winding 101 as shown in FIG. 11, so that the electrostatic capacitance shown in FIG. 10 is prevented from being formed.

Accordingly, when the core 105 of the third embodiment of the transformer T is connected to its secondary side, an electrostatic shield is achieved between the core and the secondary side. Thus, this example is improved in shielding effect as compared with the second example. That is, when the core is connected to the secondary side in the second example, the electromotive force between the primary side and the secondary side of the transformer is about 1/10 of that of the prior art, while the electromotive force of the third embodiment is about 1/20 of that of the prior art, which will mean that the shielding effect of the third example is about twice that of the second example.

The above description is given on some preferred embodiments of the invention, but it will be easily understood that the present invention is not needed to be limited to the above examples, and many modifications and variations could be effected based upon the idea of the invention.

For example, it is possible that one of or both of the shield plates 103 and 104 are used two and at least one of two of the respective shield plates 103 and 140 is connected to the primary or secondary side. In this case, it is possible that two shield plates 103 and one shield plate 104 are used and one of two shield plates 103 near the primary side is connected thereto, while the shield plate 104 is connected to the secondary side.

It is also possible that more than two shield plates 131 can be used.

Further, in the case that the core 105 is connected to the primary side in the third example, it is possible that the shield plate 131 is disposed between the secondary winding 102 and the core 105 to achieve the electrostatic shielding therebetween.

We claim as our invention:

1. A transformer comprising:
   (a) a primary winding having a pair of terminals;
   (b) a secondary winding having a pair of terminals;
   (c) a magnetic core provided in connection with said primary and secondary windings magnetically and connected to one terminal of said secondary winding electrically;
   (d) a first static shield body provided at the side of said primary winding and between said primary and secondary windings;
   (e) a second static shield body provided at the side of said secondary winding and between said primary and secondary windings;
   (f) a third static shield body provided between said magnetic core and said primary winding;
   (g) means for connecting said first and third static shield bodies to one terminal of said pair of terminals of said primary winding, respectively; and
   (h) means for connecting said second static shield body to one of the pair of terminals of said secondary winding.

* * * * *